(No Model.)

J. C. BAYLES.
PIPE OR TUBING.

No. 427,659. Patented May 13, 1890.

Witnesses:
Raphael Netter
Robt F. Gaylord

Inventor
James C Bayles,
By
Duncan Curtis & Page
Attorneys.

THE NORRIS PETERS CO., PHOTO-LITHO., WASHINGTON, D. C.

UNITED STATES PATENT OFFICE.

JAMES C. BAYLES, OF NEW YORK, N. Y.

PIPE OR TUBING.

SPECIFICATION forming part of Letters Patent No. 427,659, dated May 13, 1890.

Application filed July 27, 1889. Serial No. 318,922. (No model.)

*To all whom it may concern:*

Be it known that I, JAMES C. BAYLES, of the city, county, and State of New York, have invented certain new and useful Improvements in Pipes or Tubing, of which the following is a full, clear, and exact description.

The present invention relates to the production of pipes that shall have a capacity to resist external corrosion or oxidation—that is to say, it is desirable for many purposes to use pipe where the conditions are such that oxidation or corrosion make it impractical to employ common iron or steel pipe of such thinness or lightness of stock as would suffice but for the conditions that result in the destruction of the metal of the pipe from its exterior. To employ pipe of heavier stock manifestly increases the cost of the pipe and does not materially lengthen the life of the same. These effects are experienced in mining or similar work, where pipes that may be used to convey air or steam, or even water, are exposed to acidulous drainage or corroding vapors, as also where pipes are buried in earth that is impregnated with oxidizing or corroding substances or liquids.

The object of my invention is to protect costly high-pressure pipe where exposed to the influences of acidulated gases or earth impregnated with any gas or substance capable of eating away steel or iron. It has been attempted to accomplish this object by a lead covering; but as ordinarily applied such lead covering would be more costly than the pipe. It has also been discovered that it is only a very thin covering of lead which is required; but such thin covering is subjected to abrasion and could not stand the wear and tear that the pipe is subjected to during transportation and laying.

To this end I have devised a light metal pipe provided with an exterior coating or sheathing of lead protected by an armor—such as, for instance, metallic strips, bands, or wire—that may be eaten away or not after the pipe is laid.

Figure 1:
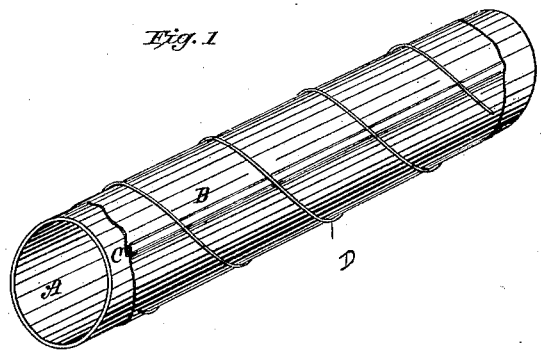
Figure 2:
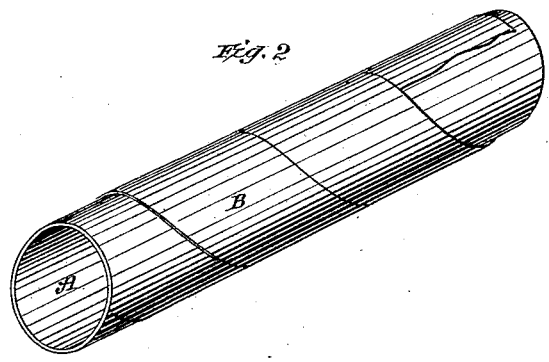
Figure 3:
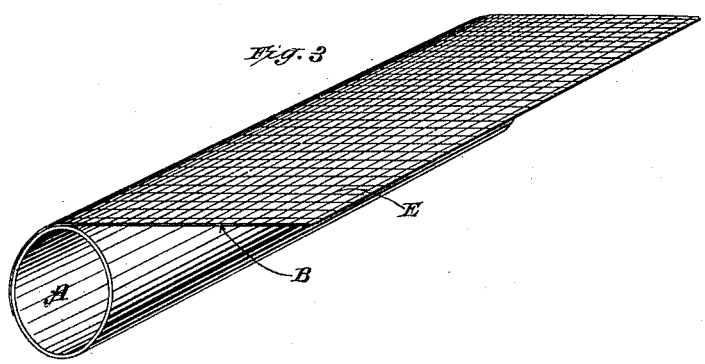
Figure 4:

In the drawings, Figure 1 illustrates a section of iron or steel pipe covered with a sheathing or envelope of lead. Figs. 2 and 3 illustrate the same, but with the coatings differently applied; and Fig. 4 shows an enlarged section of one form of the lead sheathing.

Referring to the drawings in detail, A represents the body of the pipe. This may be of iron or steel, and may be made in any suitable way, though it is best that the seams of the same project as little as possible. I prefer to use sheet-steel in the manufacture of the body of the pipe and to wind the same spirally into pipe form, joining the overlapping edges by welding them together, whereby is produced a light pipe of large or small diameters capable of being easily handled and withstanding high pressure.

B is the coating or sheathing of lead. This will usually be in sheet form, and is wrapped around the pipe-body with its opposite edges joined together along a longitudinal seam C. The body of the pipe may be previously coated with a suitable cement, which is at once protective of the iron and strongly adhesive—such as asphalt-varnish or other like material—or this cement may be put on as the sheet of lead is applied. It is for the purpose of firmly securing the lead coating to the body of the pipe and protecting the pipe.

D represents a wire or band that is wound around the sheathing of lead. This is to hold the sheathing in place on the pipe, and also serves to protect it in handling and transporting the pipe. This is an essential feature, as the sheet-lead will ordinarily be quite thin, and it is important to protect it against abrasion. After the pipe has been put in place this band may suffer the effects of corrosion and be destroyed; but this is not detrimental to the pipe-covering, as it then will be no longer subject to injury. As shown in Fig. 1, this band is wound spirally around the pipe; but it may be otherwise applied. Thus in Figs. 3 and 4 I illustrate the use of wire-netting E as an outside cover to the lead. When this netting is used, it will most generally be applied to the lead sheathing before the lead is put upon the pipe—that is, the netting and lead sheathing will be laid face to face and then passed through proper pressure-rolls, which will force the netting into the body of the lead, thus producing a compound sheet that may be applied to the iron pipe the same as the lead sheathing of Fig. 1, but will not require to be further banded or wired as a protection against abrasion or other accidental injury that would expose the surface of the iron body of the pipe.

Fig. 3 shows a pipe covered with a sheathing of lead that is wound on spirally, its opposite edges being joined in any suitable way, as by a simple lap or lock joint, by cement, or by soldering or brazing. Sheathing thus applied may of course have the exterior protecting wire banding or netting of Figs. 1 or 3.

I have herein spoken of the sheathing as being composed of lead; but obviously alloys of lead may be employed, or any other metal in lieu of lead that will serve a similar purpose. So, too, though it is desirable in many cases to have the lead coating protected, as set forth, this is not necessary in all cases.

By my invention I am enabled to make use of a very light metallic pipe having a thin layer of lead, which will not be subject to abrasion, and can stand the usual wear and tear that such pipes are subjected to during transportation and while being laid.

What is claimed as new is—

1. As a new article of manufacture, a pipe consisting of a body of iron or steel, an exterior sheathing of lead covering the surface of the pipe, and a sheet of wire-netting placed upon the said sheathing for protecting the same against abrasion or injury.

2. As a new article of manufacture, a pipe consisting of a body of iron or steel and an exterior sheathing composed of sheet-lead having wire-netting pressed or forced into the body of the lead, substantially as described, and for the purpose specified.

JAMES C. BAYLES.

Witnesses:
ROBT. F. GAYLORD,
FRANK B. MURPHY.